United States Patent Office 2,698,065
Patented Dec. 28, 1954

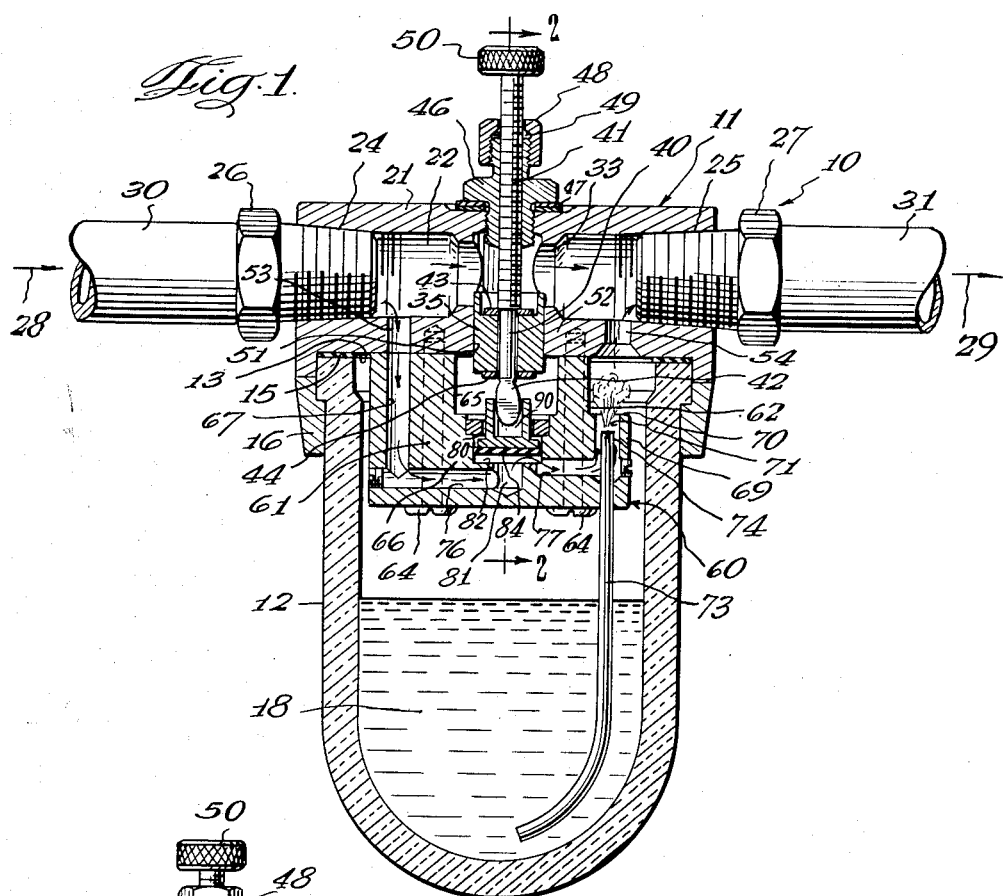

2,698,065

AIR LINE LUBRICATING DEVICE

Seymour F. Streicker, John J. Oros, and John Skidmore, Chicago, Ill., assignors to Air-Mite Devices, Inc., Chicago, Ill., a corporation of Illinois Application October 12, 1953, Serial No. 385,402

14 Claims. (Cl. 184—55)

This invention is concerned with an air line lubricating device of the character designed to be connected into a compressed air line supplying pneumatically operated tools and which automatically provides lubricant to be carried through the line to the tools for lubricating the same.

This is a continuation-in-part of our co-pending application Serial No. 262,454 filed December 19, 1951, and entitled Air Line Lubricating Device.

In said co-pending application it was pointed out that prior devices of the character herewith concerned have operated on the principle of mechanically dispersing the fluid lubricant into the air line. In such prior devices, the liquid lubricant was dropped into the air stream where theoretically it was broken into a fine aerosol or spray which passes with the air of the line to the tool. Where the lubricant was not adequately broken up, large droplets or clusters of oil were carried to the tool, thereby increasing the tendency of the air line to "spit" or throw the large droplets or clusters of such lubricant. Excess oil was likely to be supplied to the tool, with the possibility of soiling the clothes and skin of the workmen, as well as the work.

The co-pending application has as the objects thereof the provision of an air line lubricating device in which the lubricant is dispersed into the air stream in the form of finely divided spray so that it is not necessary to rely on the unreliable results obtained from the breaking up of the drops of lubricant by the air stream as in prior devices; the provision of means for controlling the amount of spray entering the air stream of the device; the provision of a simple and economically operated device for providing lubricant in the form of a fine spray for the pneumatic tools; the provision of atomizing means for breaking the lubricant into a fine spray prior to its being fed into the air stream; and the provision of a compact and durable device.

All of the objects are common with the invention herein, but in addition, certain advantages accrue by reason of refinements set forth hereinafter.

The structure of the co-pending application includes a block member connected to the head of the lubricating device on the interior of the bowl and secured to the bottom of the head. A passageway extends through the head and the air of the line is adapted to pass in one direction through this passageway. There are two openings from the passageway into the bowl, one on the upstream end and one on the downstream end of the passageway. The block member, which is basically a conduit, has an atomizer incorporated therein immediately below the downstream opening so that spray formed by the atomizer will find its way into the passageway and be swept to the tool with the ambient air. The conduit of the block member is connected at one end to the upstream opening from the main passageway and the air diverted into the conduit of the block member is fed to the atomizer.

The atomizer includes a tube which dips into the sump of oil and the block conduit permits air to be blown past the end of this tube, suck the oil up from the sump and cause it to atomize at the end of the tube, which is the nozzle of the atomizing jet. The atomizer is spaced below said downstream opening so that low pressure relief from the said downstream opening is had into the interior of the bowl.

Control of the amount of oil dispensed into the line is achieved by means of a plug movable into the main passageway between the upstream and downstream openings. The greater the amount of air permitted to pass through the main passageway, the less air will be diverted into the upstream passageway through the conduit of the block to operate the atomizer.

Even with the plug completely out of the path of the main passageway so that the maximum amount of air is passing through the main passageway and the minimum amount of air is being diverted to the atomizer within the bowl, under certain conditions of high line pressure conditions, there may still be a slight amount of spray produced. For situations where it is desired that no oil be dispensed, this may be undesirable. The particular invention herein is concerned with a structure whose purpose it is positively to prevent the flow of even the most minute quantity of oil. The provision of such structure and the achievement of this end forms a principal object of this invention.

Another object of this invention is to provide a novel valve structure operable in the block member to shut off the air flow of the conduit in the block member, and still another object is to provide such a valve structure which is operated in tandem with the valve or plug controlling the amount of air passing through the main passageway in the head.

In connection with the last mentioned object, the invention includes a tandem arrangement in which opening the main passageway to its greatest extent will close the conduit of the block member, and closing the main passageway will open the conduit in the block member.

These and many other objects will become apparent as the description of the invention proceeds in connection with a detailed explanation of a preferred embodiment illustrated in the accompanying drawing in which:

Fig. 1 is a median sectional view of an air line lubricating device embodying the invention; and Fig. 2 is a fragmentary sectional view taken generally along the line 2—2 of Fig. 1 and in the indicated direction.

The lubricating device is designated generally by the reference character 10 and same is formed of a head 11 in the form of a casting or the like having a bowl 12 of some strong transparent material such as glass or plastic set into a suitable recess 13 formed in underside of the head, gasketed at 15 and held in place by a suitable annular retaining ring 16 secured by bolts or the like 17. The head and bowl are generally of circular cross section for ease of fabrication. The bowl 12 holds a sump of lubricant 18, which may be admitted to the bowl through an inlet normally plugged as shown at 19.

The top of the head 11 has a transverse continuous integrally formed boss 21 bored to provide the main passageway 22 through the head and having the ends threaded at 24 and 25 for the reception thereinto of pressure fittings, for example, 26 and 27 respectively of any suitable or well-known design. The air line hose is connected with these fittings and as indicated by the arrows 28 and 29, the inlet hose is secured at 30 and the outlet hose is secured at 31. For purposes of explanation, the left hand side of Fig. 1 is the upstream side and the right hand side of Fig. 1 is the downstream side.

The center of the main passageway 22 is provided with a reduced diameter portion 33, through which the control plug 35 will move in a line perpendicular to the axis of the main passageway 22. The principal purpose for the diameter of the portion 33 being less than the diameter of the remainder of the passageway 22 is to keep the dimensions of the plug 33 small. It is intended that the plug be able completely to block the passage of air through the main passageway 22.

The plug 35 is loosely mounted on the reduced diameter neck 40 of an elongate threaded stem 41 between the bottom of the threaded portion and a flattened elongate end 42 with interposed washers 43 and 44 limiting axial movement of the plug 35 relative to the stem and serving as thrust members. The upper end of the stem 41 is threaded into a fitting 46 mounted in the upper wall of the boss 21 and suitably gasketed as at 47. A gland 48 renders the connection between the stem 41 and the fitting 46 substantially air tight and serves as a locking device to retain the stem in any set position if desired. Packing 49 may be provided in the gland. The upper end of the stem has a knurled knob 50 for turning the stem up and down in moving the plug into and out of the reduced diameter portion 33 of the passageway 22.

The plug 35 is conveniently of cylindrical formation and it is in close fitting sliding connection with a suitable cylindrical opening 51 provided in the wall 52 between the upper chamber of the bowl 12 and the passageway 22. The stem 41, the plug 35, and the opening 51 are obviously co-axial. The dimensions of the various parts are such that throughout its entire extent of movement, although the passageway 22 is completely blocked or completely open, the plug 35 will always be within the said opening 51. Thus although at the bottom of its movement a substantial portion of the plug will be protruding into the bowl 12, there will be no passage of air through said opening 51.

The wall 52 has an upstream orifice 53 and a downstream orifice 54, the upstream orifice being connected with the conduit of the block member as described, but the downstream orifice freely opening to the bowl 12.

The block member 60 has two vertically arranged legs 61 and 62 by means of which it is secured to the underside of the head 11 by bolts 64 and an intermediate transverse groove or clearance space 65 to enable the plug 35 freely to move up and down. Thus there is a bridging portion 66 of the block between the two legs 61 and 62. The left hand leg 61 is connected over the upstream orifice 53 and is provided with a vertical channel 67 aligned with orifice 53 as a continuation thereof. Adjacent the right hand leg 62 there is provided an extension of the block member having an upper shoulder 70 which, it will be seen, is spaced below the downstream orifice 54 so that spray originating in the vertical channel 71 opening to the shoulder 70, although directed toward the orifice 54, will first pass through the intervening portion of the upper chamber of the bowl 12.

A tube 73, preferably of transparent material, dips into the sump 18 and extends up into the extension 69, being co-axial with the channel 71, but having its upper end 74 spaced below the shoulder 70. There are two horizontal channels 76 and 77 connected respectively to the bottom ends of the channels 67 and 71, extending through the length of the block member 60. The channels 76 and 77 are inter-connected as will be described, in order to convey air diverted into the orifice 53 from the main passageway 22 up the channel 71, past the end 74 of the tube 73 to create a low pressure point thereat. This provides the conditions for atomizing lubricant sucked up the tube 73 and directing a fine aerosol or spray of lubricant toward the downstream orifice 54 so that same may be carried with the air of the line 30 to the tools to which the line 31 is connected. This is in accordance with the disclosure of the said co-pending application, and further, the amount of said diverted air is controlled by moving the cylindrical plug 35 into and out of the path of the air through the main passageway 22.

It will be seen that the axes of the channels 76 and 77 are spaced apart, the former being below the latter in the embodiment illustrated. The bridging portion 66 of the block 60 has a vertical valve cavity 80 of cylindrical formation having a lower connecting well 81 thereby providing an annular valve seat 82. The channel 76 opens to the well 81 but not directly to the seat 82, while the channel 77 opens only to the seat 82 but not to the well. This is accomplished, as will be seen, by directing the channel 76 to the side wall of the well, and by directing the channel 77 to open to the side wall of the valve cavity 80. In the example illustrated, the channel 77 is formed extending with its axis either at or slightly below the valve seat 82, but stopping short of the diameter of the well 81. In the valve cavity 80 there is provided a poppet valve consisting of a disc 84 of some yieldable material such as rubber and a pressure member 85 of generally cylindrical formation, overlying the disc 84 and having a flat flanged face 86 of substantially the same size as the disc engaging the same. An enlarged portion 87 of the cavity 80 provides a recess for an annular retaining ring 88 which is force fitted in position.

The length of the pressure member is such that it protrudes through the ring 88 and into the space 65, the center thereof being provided with a hollow recess 90 within which the flattened end 42 of the stem neck 40 extends. The disc 84 is slidable so that it may ride up and down in the valve cavity 80, and the diameter of the flange 86 is also less than that of the cavity 80 to permit such movement. Likewise the body of the pressure member 85 is of lesser diameter than the inner diameter of the ring.

With the plug 35 up into the passageway 33, the valve (which includes the disc 84, and the pressure member 85) is free to be forced upward by the air being passed through the conduit of the block member. The conduit of the block member is formed of the channel 67, the channel 76, the well 81, that portion of the valve cavity between the seat 82 and the bottom surface of the disc 84, the channel 77 and the channel 71. The path of the air available to the atomizing device is indicated by the arrows passing through the block conduit. After atomization, the vapor leaves the chamber of the bowl 12 through orifice 54 as indicated by the broken line arrow.

In Fig. 1, the device is shown with the plug 35 partially into the main passageway and hence the valve free to move.

In Fig. 2, the plug has completely been withdrawn from the main passageway so that the maximum of line air is passing through said main passageway. Under this condition, the flattened portion 42 has entered the recess 90 of the pressure member and has forced the same down pressing the disc 84 upon the valve seat 82 and thereby effectively blocking the conduit of the block. No air can thus move up the channel 71 to operate the atomizing means. The sudden blasts of air which occur when a tool is operating, while serving to lower the pressure in the bowl 12 through the orifice 54 will at most draw a slight vacuum in the chamber above sump 18 without in any way affecting the atomizing device. The spacing of the shoulder 70 below the orifice 54 insures relief into the said upper chamber instead of into the passageway of the tube 73 which might draw some oil out of the sump.

Thus it is possible completely to cut off the flow of oil by virtue of the tandem connection between the valve 84, 85 and the plug 35 which is actually a valve in the passageway 22. The upper valve opens while closing the lower valve; and as the upper valve begins to close it opens the lower valve.

It is believed that the invention has been fully explained as to enable a complete understanding and appreciation thereof, and it is desired to emphasize that considerable variation in the size, proportions, and arrangements of the parts is possible without in any way departing from the spirit or scope of the invention as defined in the appended claims.

What it is desired to secure by Letters Patent of the United States is:

1. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway.

2. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway, both of said valves being connected in tandem and having external means for manipulating the same.

3. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway, both of said valves being connected in tandem and having external means for manipulating the same, the tandem connection being such as to cause the conduit to be blocked off when the passageway is opened and vice versa.

4. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway, both of said valves being connected in tandem and having external means for manipulating the same, said tandem connection being unidirectional and the strokes of the respective valves being substantially different in length, whereby movement of the passageway valve will not affect the conduit valve until the end of the stroke opening the passageway at which time the conduit valve will be operated to block the conduit, while movement of the passageway valve in a direction closing off the passageway will not affect the conduit valve except at the beginning of said movement at which time the conduit valve is released.

5. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway, both of said valves being connected in tandem and having external means for manipulating the same, said tandem connection being unidirectional and the strokes of the respective valves being substantially different in length, whereby movement of the passageway valve will not affect the conduit valve until the end of the stroke opening the passageway at which time the conduit valve will be operated to block the conduit, while movement of the passageway valve in a direction closing off the passageway will not affect the conduit valve except at the beginning of said movement at which time the conduit valve is released, said conduit valve being of the poppet type whereby at all times other than at one end of the stroke of the passageway valve the air pressure of the conduit will keep the same open.

6. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway, both of said valves being connected in tandem and having external means for manipulating the same, said conduit comprising a block member in the bowl secured to the head and including therein a valve receiving cavity having a valve seat, a pair of channels generally extending through the block member for providing a continuous passage of air from one channel to the other, but one channel opening to the top of the valve seat and the other channel opening to the bottom of the valve seat, and a valve member in the cavity movable to engage the seat and interrupt said continuous passage of air thereby blocking the conduit.

7. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway, both of said valves being connected in tandem and having external means for manipulating the same, said conduit comprising a block member in the bowl secured to the head and including therein a valve receiving cavity having a valve seat, a pair of channels generally extending through the block member for providing a continuous passage of air from one channel to the other, but one channel opening to the top of the valve seat and the other channel opening to the bottom of the valve seat, and a valve member in the cavity movable to engage the seat and interrupt said continuous passage of air thereby blocking the conduit, said valve member comprising a freely movable portion and there being means operated by the tandem connection to press the valve member upon the seat or movable away from the valve member to permit air pressure to raise the same from the seat.

8. An air line lubricating device which comprises a bowl having a sump therein with liquid lubricant disposed in the sump, a head on the bowl having a transverse passageway therethrough adapted to have inlet and outlet air line hoses connected at respective ends of the passageway, an orifice connecting between the upstream end of the passageway and the bowl and a second orifice connected from the downstream end of the passageway to the bowl, atomizing means in the bowl having its outlet juxtaposed the downstream orifice and including a tube with its lower end dipping into the sump of lubricant, a conduit connected from the upstream orifice and leading to the atomizing means for supplying the air required to operate same, a cut-off valve in the said conduit, and a cut-off valve in the said passageway, said valves having a common operating stem an end of which is disposed externally of the device for manipulating the same, and being movable in said head along a line substantially perpendicular to the axis of the passageway, said passageway valve including a plug mounted on said stem movable in and out of said passageway with selective manipulation of the stem end, said conduit valve being of the poppet type, the opposite end of the stem arranged to engage said conduit valve, the relation between said valves and stem being such that when the conduit valve is engaged by said end, said conduit valve will be operated to block the conduit and the passageway valve will be opened, while during closing of the passageway valve, said opposite stem end is free of engagement with the conduit valve.

9. In an air line lubricating device which includes a head having a central passageway therethrough adapted to have inlet and outlet air line hoses connected at respective ends thereof, a bowl secured to said head having a sump for containing liquid lubricant therein, said head having a pair of ducts each connected between the passageway and said bowl, one from the upstream end and the other from the downstream end of the passageway; an atomizer in the bowl having outlet in proximity to the downstream end and an opening in said sump, a conduit connected at one end thereof to said upstream end and terminating adjacent the outlet of said atomizer so that air entering said passageway may be diverted into said conduit for operating said atomizer, a pair of valves connected in tandem, one valve being in said conduit and the other being in said passageway, said valves being operable to block off the conduit when said passageway is open.

10. In an air line lubricating device which includes a head having a central passageway therethrough adapted to have inlet and outlet air line hoses connected at respective ends thereof, a bowl secured to said head having a sump for containing liquid lubricant therein, said head having a pair of ducts each connected between the passageway and said bowl, one from the upstream end and the other from the downstream end of the passageway; an atomizer in the bowl having outlet in proximity to the downstream end and an opening in said sump, a conduit connected at one end thereof to said upstream end and terminating adjacent the outlet of said atomizer so that air entering said passageway may be diverted into said conduit for operating said atomizer, a pair of valves connected in tandem, one valve being in said conduit and the other being in said passageway, said valves being operable to block off the conduit when said passageway is open, and including manually operable means externally of the device for operating the same.

11. In an air line lubricating device which includes a head having a central passageway therethrough adapted to have inlet and outlet air line hoses connected at respective ends thereof, a bowl secured to said head having a sump for containing liquid lubricant therein, said head having a pair of ducts each connected between the passageway and said bowl, one from the upstream end and the other from the downstream end of the passageway; an atomizer in the bowl having outlet in proximity to the downstream end and an opening in said sump, a conduit connected at one end thereof to said upstream end and terminating adjacent the outlet of said atomizer so that air entering said passageway may be diverted into said conduit for operating said atomizer, a pair of valves connected in tandem, one valve being in said conduit and the other being in said passageway, said valves being operable to block off the conduit when said passageway is open, said tandem connection including a stem movably mounted in said head along a line substantially perpendicular to the axis of said passageway, said conduit valve including a member coaxially mounted on said stem intermediate the ends thereof and adapted to be moved in and out of said passageway between positions fully opening and completely closing said passageway, said stem arranged to close said conduit valve only when the member is in full open position and release said conduit valve at the beginning of movement of said member to its completely closing position.

12. In an air line lubricating device which includes a head having a central passageway therethrough adapted to have inlet and outlet air line hoses connected at respective ends thereof, a bowl secured to said head having a sump for containing liquid lubricant therein, said head having a pair of ducts each connected between the passageway and said bowl, one from the upstream end and the other from the downstream end of the passageway; an atomizer in the bowl having outlet in proximity to the downstream end and an opening in said sump, a conduit connected at one end thereof to said upstream end and terminating adjacent the outlet of said atomizer so that air entering said passageway may be diverted into said conduit for operating said atomizer, a pair of valves connected in tandem, one valve being in said conduit and the other being in said passageway, said valves being operable to block off the conduit when said passageway is open, said tandem connection including a stem movably mounted in said head along a line substantially perpendicular to the axis of said passageway, said conduit valve including a member coaxially mounted on said stem intermediate the ends thereof and adapted to be moved in and out of said passageway between positions fully opening and completely closing said passageway, said stem arranged to close said conduit valve only when the member is in full open position and release said conduit valve at the beginning of movement of said member to its completely closing position, said conduit valve being of the poppet type whereby at all times other than at the fully opening position of said member the air pressure of the conduit will keep the same open.

13. In an air line lubricating device which includes a head having a central passageway therethrough adapted to have inlet and outlet air line hoses connected at respective ends thereof, a bowl secured to said head having a sump for containing liquid lubricant therein, said head having a pair of ducts each connected between the passageway and said bowl, one from the upstream end and the other from the downstream end of the passageway; an atomizer in the bowl having outlet in proximity to the downstream end and an opening in said sump, a conduit connected at one end thereof to said upstream end and terminating adjacent the outlet of said atomizer so that air entering said passageway may be diverted into said conduit for operating said atomizer, a pair of valves connected in tandem, one valve being in said conduit and the other being in said passageway, said valves being operable to block off the conduit when said passageway is open, said conduit comprising a block member in the bowl secured to the head and having a cavity therein providing a valve seat, said conduit including a channel on opposite sides of the cavity for permitting a continuous passage of air through the conduit from one channel to the other, said channels each opening to opposite ends of the valve seat, said conduit valve being located in said cavity and including a member movable to engage the seat to interrupt said continuous passage of air thereby blocking the conduit 14. In an air line lubricating device which includes a head having a central passageway therethrough adapted to have inlet and outlet air line hoses connected at respective ends thereof, a bowl secured to said head having a sump for containing liquid lubricant therein, said head having a pair of ducts each connected between the passageway and said bowl, one from the upstream end and the other from the downstream end of the passageway; an atomizer in the bowl having outlet in proximity to the downstream end and an opening in said sump, a conduit connected at one end thereof to said upstream end and terminating adjacent the outlet of said atomizer so that air entering said passageway may be diverted into said conduit for operating said atomizer, a pair of valves connected in tandem, one valve being in said conduit and the other being in said passageway, said valves being operable to block off the conduit when said passageway is open, said conduit comprising a block member in the bowl secured to the head and having a cavity therein providing a valve seat, said conduit including a channel on opposite sides of the cavity for permitting a continuous passage of air through the conduit from one channel to the other, said channels each opening to opposite ends of the valve seat, said conduit valve being located in said cavity and including a member movable to engage the seat to interrupt said continuous passage of air thereby blocking the conduit, said block member having a portion thereof spaced from the head, said head having a recess therein aligned with said portion, said passageway valve including a valve member movable through said recess in and out of said space for respectively opening and closing said passageway.

References Cited in the file of this patent

UNITED STATES PATENTS

| Number | Name | Date |
|---|---|---|
| 1,907,045 | Curtis | May 2, 1933 |
| 2,073,009 | Hersey et al. | Mar. 16, 1937 |
| 2,187,241 | Kehle | Jan. 16, 1940 |
| 2,613,067 | Goodyer | Oct. 7, 1952 |